United States Patent
Ichikawa et al.

(10) Patent No.: US 7,888,930 B2
(45) Date of Patent: Feb. 15, 2011

(54) METHOD FOR TESTING MOLD STRUCTURE AND MAGNETIC RECORDING MEDIUM

(75) Inventors: Kenji Ichikawa, Kanagawa (JP); Naoto Fujiwara, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 309 days.

(21) Appl. No.: 12/142,914

(22) Filed: Jun. 20, 2008

(65) Prior Publication Data

US 2009/0068497 A1    Mar. 12, 2009

(30) Foreign Application Priority Data

Jun. 21, 2007    (JP)    ............................. 2007-163769

(51) Int. Cl.
*G01R 33/12*    (2006.01)
(52) U.S. Cl. ....................................................... 324/212
(58) Field of Classification Search .......... 324/210–212
See application file for complete search history.

(56) References Cited

U.S. PATENT DOCUMENTS

2009/0244787 A1* 10/2009 Giorgi et al. ................ 360/313

FOREIGN PATENT DOCUMENTS

| JP | 58115378 A | * | 7/1983 |
| JP | 2004-253040 A | | 9/2004 |

* cited by examiner

*Primary Examiner*—Jay M Patidar
(74) *Attorney, Agent, or Firm*—Sughrue Mion, PLLC

(57) ABSTRACT

The present invention provides a method for testing a disc shaped mold structure having a convexo-concave pattern formed on a surface thereof based on a desired design pattern, including at least: transferring a magnetic signal corresponding to a convexo-concave pattern formed on the entire surface of the mold structure to a medium in a direction perpendicular to the surface of the medium, obtaining a reproduction signal by electrically reproducing the magnetic signal from the medium onto which the magnetic signal has been transferred, and comparing the desired design pattern with the reproduction signal.

5 Claims, 8 Drawing Sheets

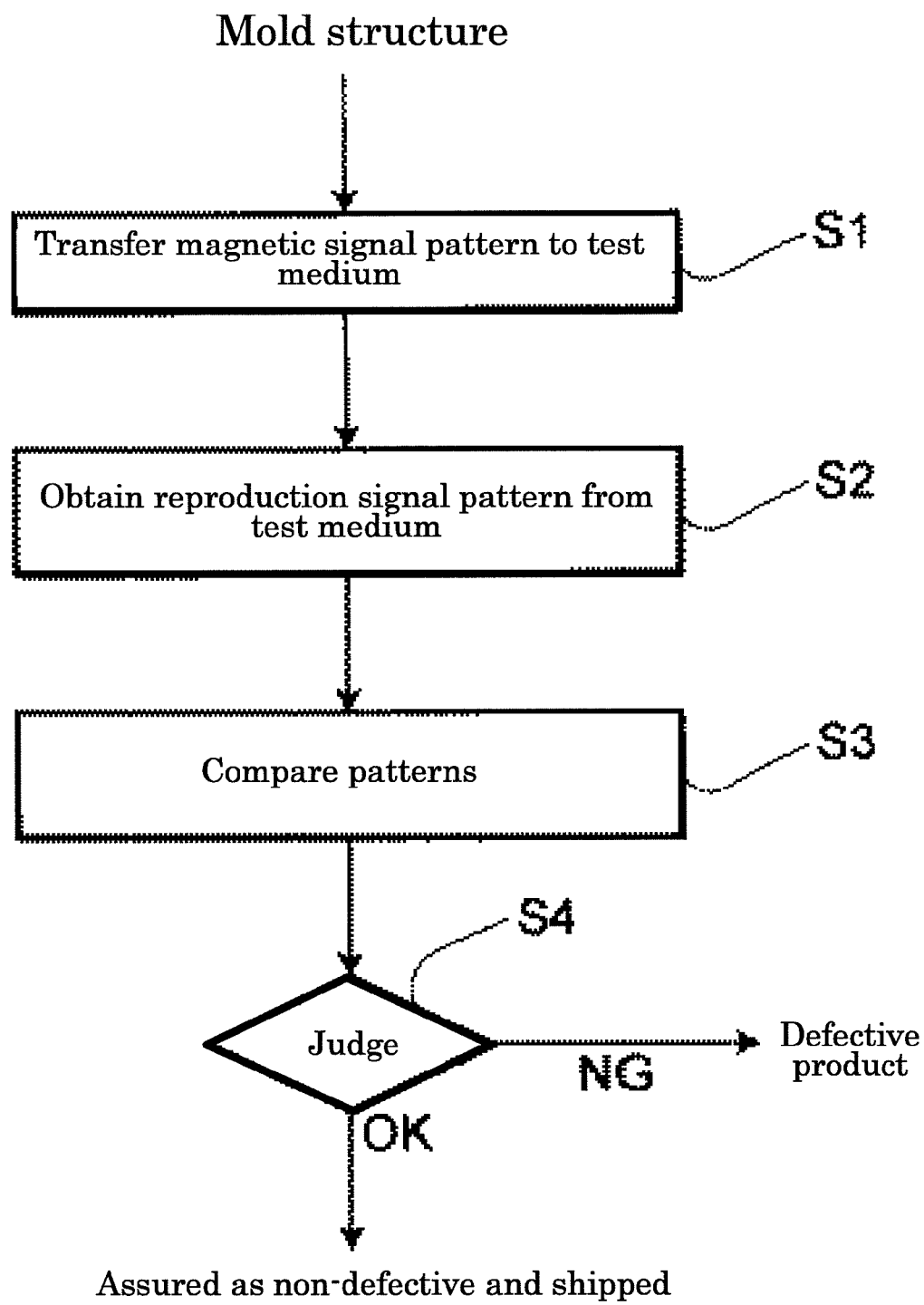

Data area | Servo area | Data area | Servo area | Data area | Servo area | Data area

METHOD FOR TESTING MOLD STRUCTURE AND MAGNETIC RECORDING MEDIUM

BACKGROUND OF THE INVENTION

1. Field of the Invention

The present invention relates to a method for testing a mold structure, a mold structure, a mold original master and a magnetic recording medium, and particularly relates to a method for testing a disc-shaped mold structure having a convexo-concave pattern formed on a surface thereof based on a desired design pattern, a mold structure tested by the test method, a mold original master tested by the test method, a magnetic recording medium produced by using a mold structure tested by the test method and a magnetic recording medium produced by using a mold original master tested by the test method.

2. Description of the Related Art

In the field of magnetic recording media, generally, with an increased amount of information, a medium is desired which is capable of recording a large amount of information (having high capacity) and costs less and preferably allows for a so-called high-speed access so that a necessary part of the medium can be read in a short time. As an example of such a magnetic recording medium, a high density magnetic recording medium (magnetic disc medium) used in hard disc devices or flexible disc devices has been known.

A convexo-concave pattern formed in a surface of a high density magnetic recording medium (magnetic disc medium) is formed according to a convexo-concave pattern formed in the surface of a mold structure. However, after the high-density magnetic recording medium (magnetic disc medium) is incorporated into a disc drive, it sometimes turns out that there is a defect originating from the convexo-concave pattern formed in the surface of the high-density magnetic recording medium, which causes a delay in the feedback.

To solve such a problem, a method is conceivable in which after testing the quality of a convexo-concave pattern formed on a surface of a mold structure, the convexo-concave pattern is formed in the surface of the high density magnetic recording medium (magnetic disc medium) using the mold structure that has passed the test.

As the method of testing a convexo-concave pattern formed in the mold structure, there are for example, the following method: a method to measure the length of a top surface using a measuring scanning electron microscope, a method to measure the height of a pattern in the cross sectional direction using a transmission electron microscope (TEM), and a method to evaluate a pattern cross section using a critical dimension atomic force microscope (CD-AFM) and an atomic force microscope (AFM). These test methods, however, are suitable for testing a part of a convexo-concave pattern, and it is very difficult to test a convexo-concave pattern formed on the entire surface of the mold structure.

Furthermore, many conventional HDD inspection systems are using laser light, and while they can detect defects on a supper smooth surface, they cannot detect defects of a mold structure with a convexo-concave pattern formed on its surface, because laser light is scattered in the convexo-concave pattern. Alternatively there is a method to recognize a convexo-concave pattern by deep UV method as a semiconductor test method, however, it is very difficult to test a convexo-concave pattern formed on the entire surface of the mold structure by this method and the resolution is low (at a level of 100 nm).

Note that a method for testing a convexo-concave pattern using a magnetic transfer method is disclosed in Japanese Patent Application Laid-Open (JP-A) No. 2004-253040, however, this test method was limited to methods of testing a master carriers for magnetic transfer. In addition, a convexo-concave pattern corresponding to data areas (discrete area) is different from a convexo-concave pattern corresponding to servo areas in height. As a result, the convexo-concave pattern corresponding to the data areas (discrete area) and the convexo-concave pattern corresponding to the servo areas cannot be magnetically transferred by an in-plane magnetic recording method at a time.

BRIEF SUMMARY OF THE INVENTION

The present invention is provided in view of the present situation, and aims at solving the aforementioned problems in related art and achieving the following objects. Namely, objects of the present invention are to provide a method for testing a mold structure that is capable of assuring the quality, with respect to the entire surface of the mold structure, of a convexo-concave pattern formed in the surface of a mold structure (it is otherwise referred to as a "stamper") for forming a convexo-concave pattern in a magnetic recording medium such as a discrete track medium and a patterned medium, a mold structure tested by the test method, a mold original master tested by the test method, a magnetic recording medium produced by using a mold structure tested by the test method and a magnetic recording medium produced by using a mold original master tested by the test method.

Means for solving the problems are as follows.

<1> A method for testing a mold structure having a convexo-concave pattern formed on a surface thereof based on a desired design pattern, the method including at least, transferring a magnetic signal corresponding to a convexo-concave pattern formed on the entire surface of the mold structure to a medium in a direction perpendicular to the surface of the medium, obtaining a reproduction signal by electrically reproducing the magnetic signal from the medium onto which the magnetic signal has been transferred, and comparing the desired design pattern with the reproduction signal.

Since the magnetic signal corresponding to the convexo-concave pattern formed on the entire surface of the mold structure is transferred to the medium in a direction perpendicular to a surface of the medium, since the magnetic signal from the medium, onto which the magnetic signal has been transferred, is electrically reproduced to produce the reproduction signal, and since the desired design pattern is compared with the reproduction signal in this test method of the mold structure, quality of the convexo-concave pattern in the mold structures (it is otherwise referred to as a "stamper") for forming a convexo-concave pattern in a magnetic recording medium such as a discrete track medium and a patterned medium can be assured with respect to the entire surface of the mold structure.

<2> The method for testing a mold structure according to the item <1>, wherein the mold structure is formed in a disc-shape, the convexo-concave pattern formed on the entire surface of the mold structure includes a first convexo-concave pattern formed in a direction perpendicular to the circumferential direction of the mold structure, and a second convexo-concave pattern of any one of convexo-concave pattern formed in the circumferential direction of the mold structure and a convexo-concave pattern where a plurality of bits are arranged.

<3> The method for testing a mold structure according to any one of the items <1> and <2>, further including at least providing a magnetic layer to the mold structure before the magnetic transfer.

<4> The method for testing a mold structure according to any one of the items <1> to <3>, wherein in the obtainment of the reproduction signal, the magnetic signal that has been transferred to the medium is tested continuously.

<5> The method for testing a mold structure according to any one of the items <1> to <4>, wherein in the obtainment of the reproduction signal, the magnetic signal that has been transferred to the medium is tested discretely.

<6> A mold structure tested by the method for testing a mold structure according to any one of the items <1> to <5>.

<7> A mold original master tested by the method for testing a mold structure according to any one of the items <1> to <5>.

<8> A magnetic recording medium produced by using the mold structure according to the item <6>.

<9> A magnetic recording medium produced by using the mold original master according to the item <7>.

The present invention can provide a method for testing a mold structure that is capable of assuring the quality, with respect to the entire surface of a mold structure, of a convexo-concave pattern formed in the surface of a mold structure for forming a convexo-concave pattern in a magnetic recording medium such as a discrete track medium and a patterned medium, a mold structure tested by the test method, a mold original master tested by the test method, a magnetic recording medium produced by using a mold structure tested by the test method and a magnetic recording medium produced by using a mold original master tested by the test method.

BRIEF DESCRIPTION OF THE SEVERAL VIEWS OF THE DRAWINGS

FIG. 5 is a diagram for explaining one embodiment of the method for testing mold structures according to the present invention.

DETAILED DESCRIPTION OF THE INVENTION

Hereinafter, the method for testing a mold structure of the present invention will be described with reference to the drawings.

(Method for Testing Mold Structure)

The method for testing a mold structure of the present invention is a method for testing a disc shaped mold structure having a convexo-concave pattern formed on a surface thereof based on a desired design pattern.

First, a mold structure which is a subject to be tested by the method for testing mold structures of the present invention, and a method for producing the mold structure will be described.

<Mold Structure>

Figure 1:
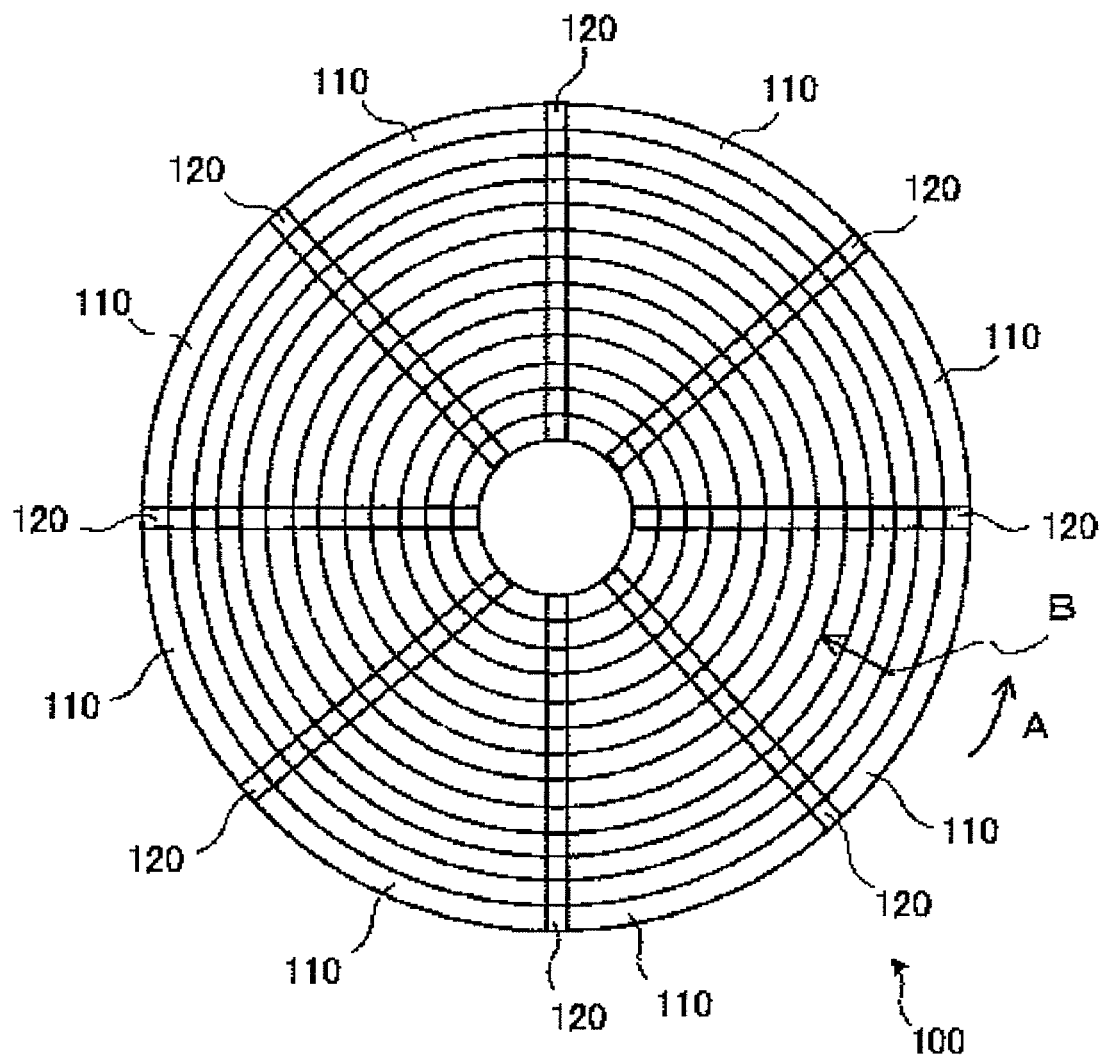
FIG. 1 is a plan view exemplarily showing a schematic structure of a mold structure to be tested by the method for testing a mold structure according to the present invention.
Figure 2:
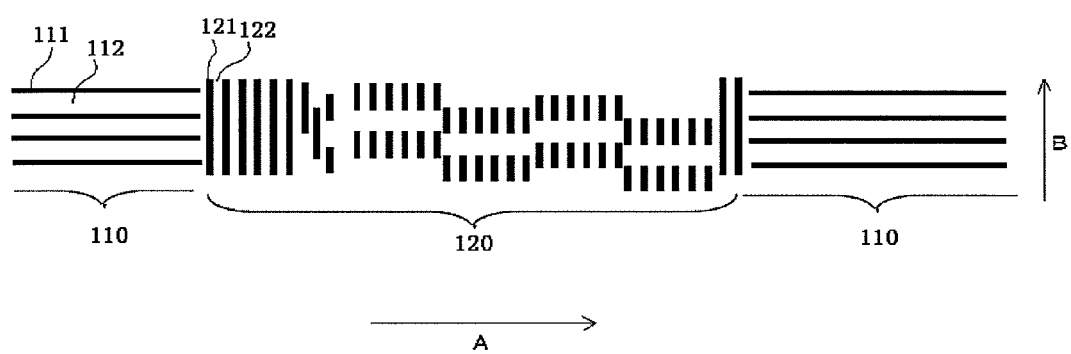
FIG. 2 is a plan view exemplarily showing a partial structure of a mold structure used for producing a discrete track medium (DTM) according to the present invention.
Figure 3:
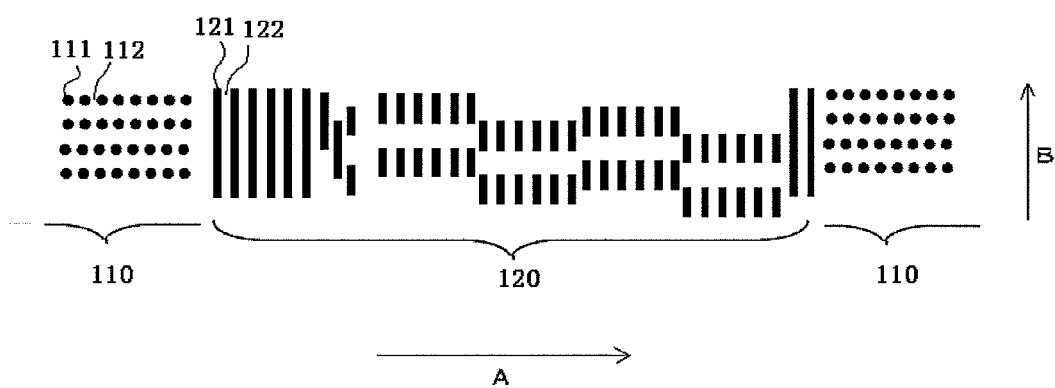
FIG. 3 is a plan view exemplarily showing a partial structure of a mold structure used for producing a patterned medium according to the present invention.

FIG. 1 is a plan view exemplarily showing a schematic structure of a mold structure to be tested by the method for testing a mold structure according to the present invention. In addition, FIG. 2 is a plan view exemplarily showing a partial structure of a mold structure used for producing a discrete track medium (DTM) according to the present invention. FIG. 3 is a plan view exemplarily showing a partial structure of a mold structure used for producing a patterned medium according to the present invention.

As shown in FIGS. 1 to 3, a mold structure 100 is used for producing a magnetic recording medium and equipped with at least a convexo-concave pattern 110 corresponding to data areas of the magnetic recording medium, and a convexo-concave pattern 120 corresponding to the servo areas of the magnetic recording medium, and further equipped with other members as required.

Convexo-Concave Pattern Corresponding to Data Area

As shown in FIGS. 2 and 3, a convexo-concave pattern 110 corresponding to data areas has at least a concave portion 111 corresponding to a magnetic area in the magnetic recording medium and a convex portion 112 corresponding to a non-magnetic area in the magnetic recording medium.

Here, the convexo-concave pattern 110 corresponding to data areas is a convexo-concave pattern formed in the circumferential direction A of the mold structure 100 (FIG. 2) or a convexo-concave pattern where a plurality of bits are arranged (FIG. 3).

Convexo-Concave Pattern Corresponding to Servo Area

As shown in FIGS. 2 and 3, a convexo-concave pattern 120 corresponding to servo areas has a concave portion 121 corresponding to a magnetic area in the magnetic recording medium and a convex portion 122 corresponding to a non-magnetic area in the magnetic recording medium, and is formed in a radial direction B perpendicular to the circumferential direction A of the mold structure 100.

Other Members

The other members are not particularly limited, and can be appropriately selected depending on the purpose, as long as they do not impair the effects of the present invention. Examples thereof include a mold surface layer providing an imprint resist layer with a function to peel, and a carbon film provided as a protective film.

<Method for Producing Mold Structure>

Hereinafter, a method for producing a mold structure 100 used in the present invention will be described with reference to the drawings. The mold structure 100 used in the present invention may be a mold structure produced by a method other than the method described below.

Preparation of Original Master

Figure 4A:
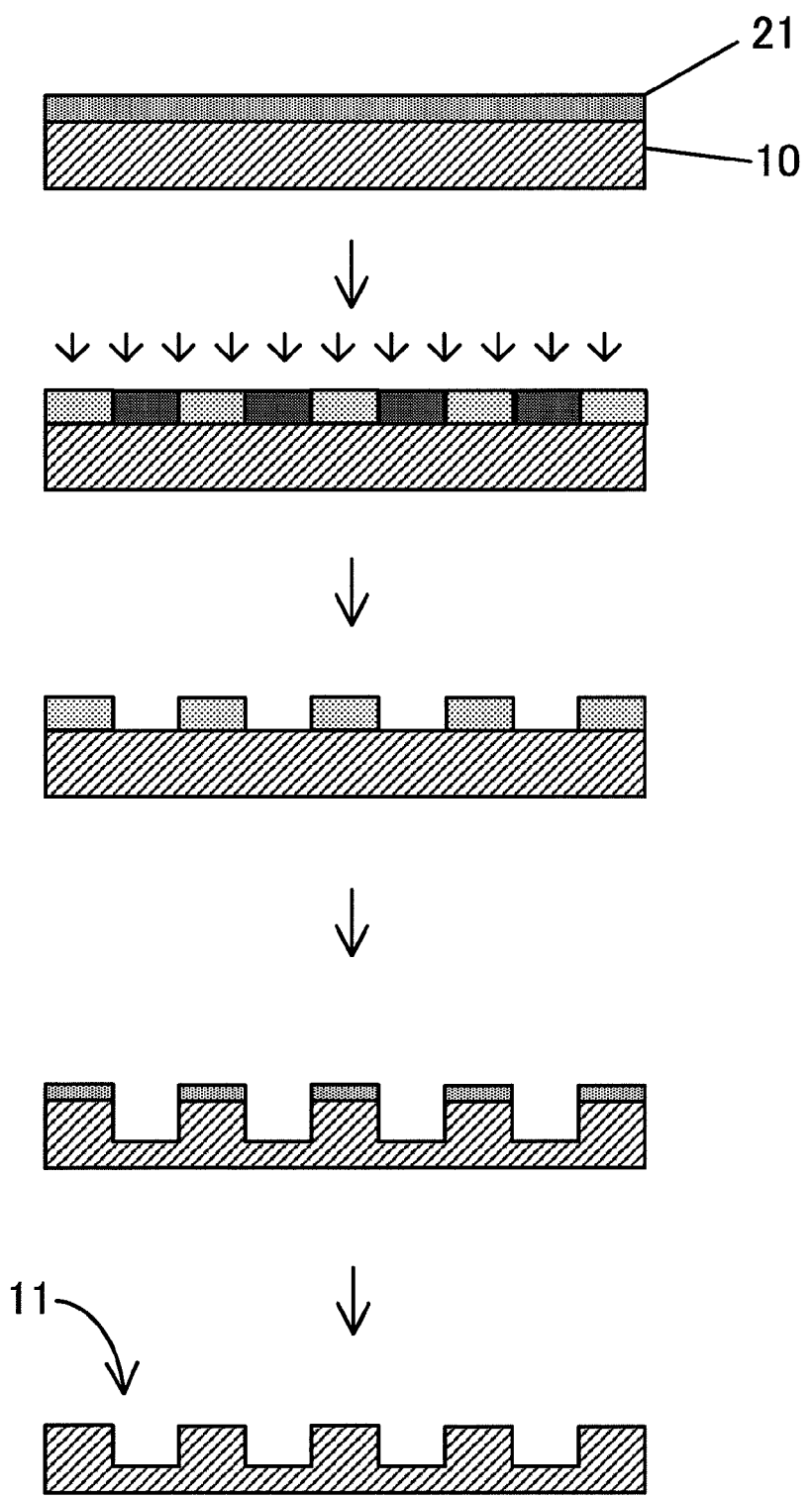
FIG. 4A is a cross-sectional view exemplarily showing a method for producing a mold structure according to the present invention.
Figure 4B:
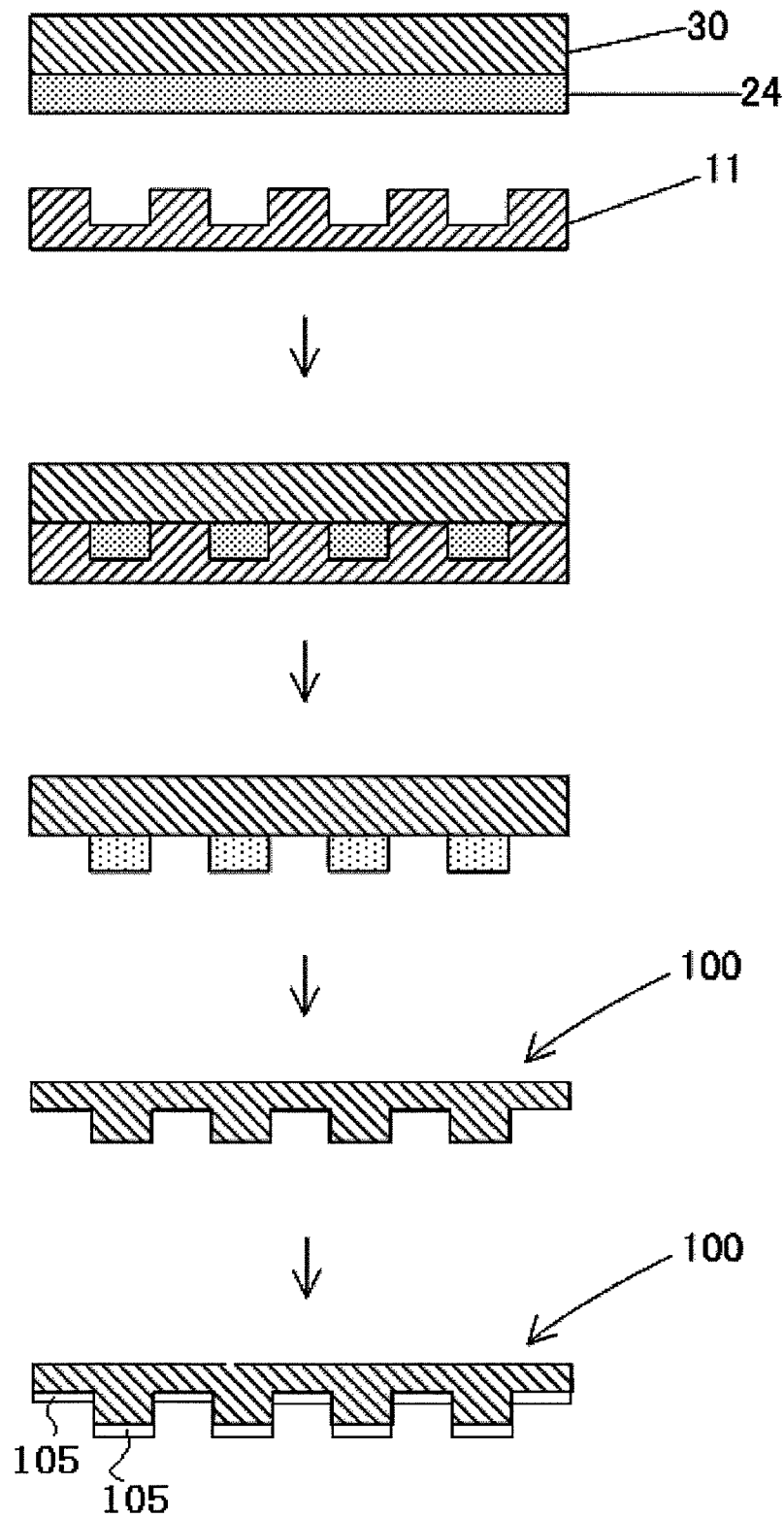
FIG. 4B is a cross-sectional view exemplarily showing a method for producing a mold structure according to the present invention.

FIGS. 4A and 4B are respectively a cross-sectional view showing a method for producing a mold structure 100. First, as shown in FIG. 4A, an electron beam resist solution is applied over a surface of an Si substrate 10 by spin-coating or the like to form a photoresist layer 21.

After that, an electron beam modulated correspondingly to a servo signal is applied to the surface of the Si substrate 10, while rotating the Si substrate 10, and the entire photoresist surface is exposed to the electron beam such that a region corresponding to each frame on the circumference of the Si substrate 10 is exposed to form a desired pattern, for example, a pattern corresponding to a servo signal that linearly extends in a radius direction of each track from the rotational center of the Si substrate.

Subsequently, a photoresist layer 21 is subjected to a developing process to remove the exposed region, and the Si substrate is then selectively etched by RIE or the like using as a mask the pattern formed on the photoresist layer 21 in which the exposed region has been removed, to thereby obtain an original master 11 (mold original master) having a convexo-concave pattern.

Preparation of Mold Structure

Next, as shown in FIG. 4B, the original master 11 is pressed against a surface of a quartz substrate 30 as a workpiece substrate on which an imprint resist layer 24 is formed on the surface by applying an imprint resist solution containing a photo-curable resin, and the convexo-concave pattern formed in the original master 11 is transferred to the imprint resist layer 24.

The material of the substrate to be processed is not particularly limited, can be appropriately selected depending on the purpose, as long as it has optical transparency and has strength to function as a mold structure, and, for example, quartz ($SiO_2$) is exemplified.

The description "a material has optical transparency" specifically means that when a light beam is incident from a certain surface of the base to be processed such that the light beam exits from the other surface on which the imprint resist layer has been formed, the imprint resist solution is sufficiently cured, and means that the light transmittance of light beam emitted from the certain surface to the other surface is 50% or more.

Further, the description "a material has strength to function as a mold structure" means that the material has such strength that it can bear stress when a mold structure is pressed against an imprint resist layer formed on a magnetic recording medium base under the condition of an average surface pressure of 4 kgf/$cm^2$ and the imprint resist layer is pressurized.

Curing Step

Then, the transferred pattern is cured by applying ultraviolet ray or the like to the imprint resist layer 24.

Pattern Forming Step

Subsequently, with the transferred pattern using as a mask, the quartz substrate is selectively etched by RIE or the like to thereby obtain a mold structure 100 having a convexo-concave pattern formed on the surface.

Note that the method for producing the above mentioned mold structure 100 is nanoimprint lithography (NIL) using ultraviolet ray, however the method is not limited to this, and may be, for example, nanoimprint lithography (NIL) using heat in which an Ni conductive layer is provided on an original master 11 having a convexo-concave pattern, followed by electroforming with Ni and peeling off the Ni conductive layer from the original master 11 to thereby obtain an Ni mold.

Magnetic Layer Providing Step

In the magnetic layer providing step, a magnetic layer 105 composed of $Fe_{70}Co_{30}$ is provided as required by sputtering on a surface of the mold structure 100 obtained as described above. The magnetic layer 105 is made to have a thickness of 20 nm. Note that layers such as a protective layer and a lubricant layer may be further provided on the magnetic layer 105 in the magnetic layer providing step. When the mold structure 100 is the above mentioned Ni mold, magnetic transfer can be performed without providing the magnetic layer 105 in the above mentioned magnetic layer providing step. On the other hand, when the mold structure 100 is a nonmagnetic mold, magnetic transfer cannot be performed without providing the magnetic layer 105 in the above mentioned magnetic layer providing step.

The mold structure 100 is prepared as described above, and whether the convexo-concave pattern formed in the surface of the mold structure 100 coincides with the pattern as designed is tested by the method for testing a mold structure of the present invention.

Hereinabove, the mold structure which serves as a subject to be tested by the method for testing a mold structure of the present invention is described, but the subject to be tested by the method for testing a mold structure of the present invention is not limited to the mold structure 100, and may be an original master 11 used in producing the mold structure 100. When the original master 11 is a plate onto which magnetic transfer cannot be performed without modification, such as an Si original master, a magnetic layer is provided in the same manner as in the above mentioned magnetic layer providing step.

The method for testing a mold structure of the present invention includes at least a magnetic transfer step, a reproduction signal obtaining step, and a comparing step, and further includes other steps appropriately selected as required.

<Magnetic Transfer Step>

The magnetic transfer step is a step of transferring magnetic signals corresponding to convexo-concave patterns 110 and 120 formed on the entire surface of the mold structure 100 to a test medium to be transferred, in a direction perpendicular to the surface of the test medium (recording vertically) (S1 in FIG. 5).

It has been difficult to transfer, in in-plane recording, a magnetic signal corresponding to the convexo-concave pattern 110 formed in the circumferential direction A of the mold structure 100 (FIG. 2), or a magnetic signal corresponding to the convexo-concave pattern 120 where a plurality of bits are arranged (FIG. 3). However, by transferring the magnetic signals in a direction perpendicular to the test medium (recording vertically), magnetic information can be transferred irrespective of the pattern.

<Reproduction Signal Obtaining Step>

The reproduction signal obtaining step is a step of obtaining a reproduction signal by electrically reproducing the magnetic signals from the perpendicular magnetic recording medium (S2 in FIG. 5).

<Comparing Step>

The comparing step is a step of comparing the reproduction signal with the design pattern (S3 in FIG. 5).

<Other Steps>

The other steps are not particularly limited, can be appropriately selected depending on the purpose, as long as they do not impair the effects of the present invention, and, for example, an acceptance/rejection judging step (S4 in FIG. 5) is exemplified in which the degree of coincidence of the patterns is obtained by comparing the convexo-concave patterns in the comparing step, and acceptance or rejection of the magnetic layer pattern is judged based on whether the degree of coincidence for acceptance or rejection satisfies the predetermined criteria. Note that a mold structure 100 judged as acceptable in the acceptance/rejection judging step is shipped as a finished product, whereas a mold structure 100 judged as not acceptable is regarded as a defective product. Thus, only mold structures judged as acceptable by the method for testing a mold structure of the present invention are shipped as finished products, it is possible to provide products that are assured as non-defective products to customers.

Next, a test apparatus for carrying out the method for testing mold structures according to the present invention will be described.

<Testing Equipment>

Figure 6:
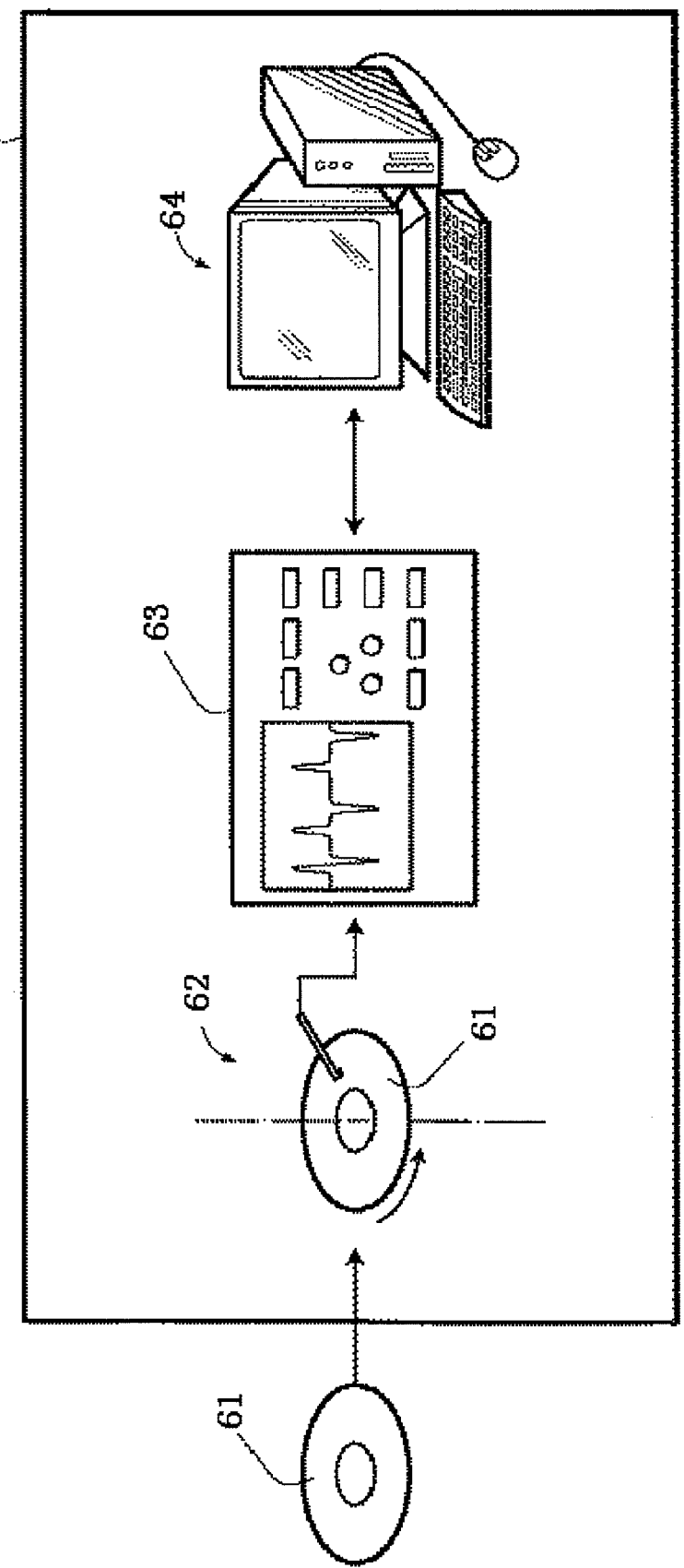
FIG. 6 is a schematic block diagram exemplarily showing testing equipment used in carrying out the method for testing mold structures according to the present invention.

FIG. 6 is a schematic block diagram of an example of testing equipment for the method for testing mold structures according to the present invention.

The testing equipment 60 is equipped with a spin-stand 62 and a digital storage oscilloscope 63 constituting a reproduction unit configured to obtain a reproduction signal pattern from a perpendicular magnetic recording medium (test medium to be transferred) 61, and a personal computer 64 constituting a comparing unit and a judging unit to which the digital storage oscilloscope 63 is connected. The personal computer 64 is provided with software for controlling retrieval of a signal pattern from the oscilloscope 63, comparing the obtained reproduction signal pattern from the oscilloscope with the design signal pattern, to thereby judge acceptance or rejection of the magnetic layer pattern.

Next, a method for testing a mold structure using the testing equipment 60 shown in FIG. 6 will be described.

First, a test medium to be transferred 61 (hereinafter, may be referred to as "test medium") is prepared, and a magnetic signal from the mold structure to be tested 100 is transferred to the test medium 61 in the direction perpendicular to a surface of the test medium (recorded vertically) to obtain a perpendicular magnetic recording medium. Magnetic transfer in the direction perpendicular to the test medium (vertical recording) is performed using a known method in the art.

The perpendicular magnetic recording medium thus obtained is set in the spin-stand 62 for evaluating electromagnetic conversion property.

In a mold structure used for producing a discrete track medium (DTM) as shown in FIG. 2, a magnetic signal transferred by using a magnetic head (71 in FIG. 7) having a read width which is substantially the same width as the track (Tr) pitch (for example, about 40 nm) is read to obtain a reproduction signal pattern, and the reproduction pattern is retrieved in the digital oscilloscope 63. Here, a magnetic signal according to the convexo-concave pattern 110 which corresponds to data areas is continuously tested (the reproduction signal in the circumferential direction is evaluated at the same track position) in an on-track state with being followed by repeated tests. Note that a doubled length of the basic frequency of the servo pattern was set as a single wavelength, and 64 points were sampled for each single frequency, as a result, a resolution of the evaluation data was sufficiently smaller than the minimum recording data width.

Figure 7:
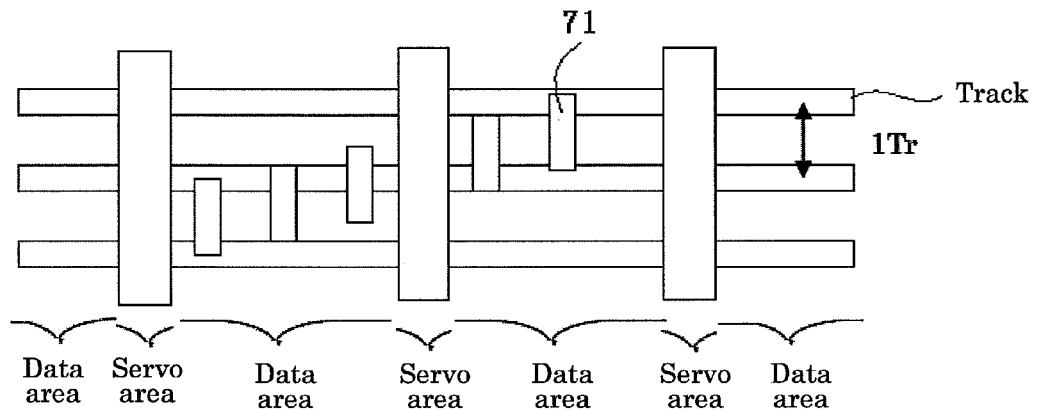
FIG. 7 is an illustration for explaining an evaluation method of a convexo-concave pattern formed in a surface of a mold structure used for producing a discrete track medium (DTM).

Furthermore, in an off-track state of not being followed (a state in which the magnetic head 71 is run in an oblique direction in FIG. 7 without being controlled by a servo), a magnetic signal according to a convexo-concave pattern 120 which corresponds to a servo area is discretely examined (inter-track evaluation is performed). In this discrete test, data are produced and evaluated while feeding the magnetic head 71 by every 10 nm in a radial direction of each track using a piezo element.

Figure 8:
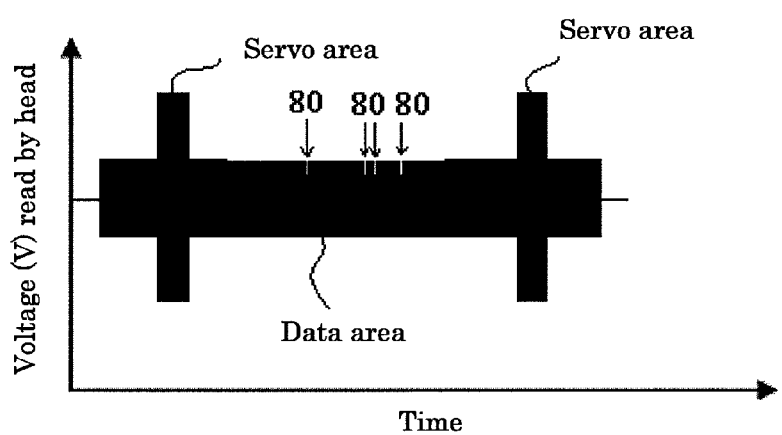
FIG. 8 is an illustration explaining a reproduction signal pattern.

The convexo-concave pattern 110 corresponding to a data area is evaluated by the continuous test and the convexo-concave pattern 120 corresponding to a servo area are evaluated by the discrete test, to thereby obtain a reproduction signal pattern shown in FIG. 8. Here, data for evaluation is collected at a sampling rate of ten-fold or more of a basic frequency f of the servo pattern to detect a miss pulse (for example 80 in FIG. 8).

For the mold structure 100 used for producing a patterned medium as shown in FIG. 3, data is accumulated and calculated in the circumferential direction A, and the frequency is analyzed to obtain the number of peaks detected.

A reproduction signal pattern (for example, FIG. 8) introduced to the digital oscilloscope 63 is further sent to the personal computer 64, in which the reproduction signal pattern is compared with the previously stored design signal pattern in the entire structure, and individual pattern portions are compared with corresponding parts in the previously stored design signal pattern. Based on the comparison carried out using the personal computer, acceptance/ rejection of the convexo-concave patterns 110 and 120 is judged.

<Method for Producing Magnetic Recording Medium>

Hereinafter, the method for producing a magnetic recording medium 1 (such as a discrete track medium or a patterned medium) using the mold structure 100 tested by the method for testing a mold structure according to the present invention, will be described with reference to the drawing. Note that the method for producing the magnetic recording medium 1 using the mold structure tested by the method for testing a mold structure according to the present invention may be a method other than the method described below as far as it uses the mold structure 100.

Figure 9:
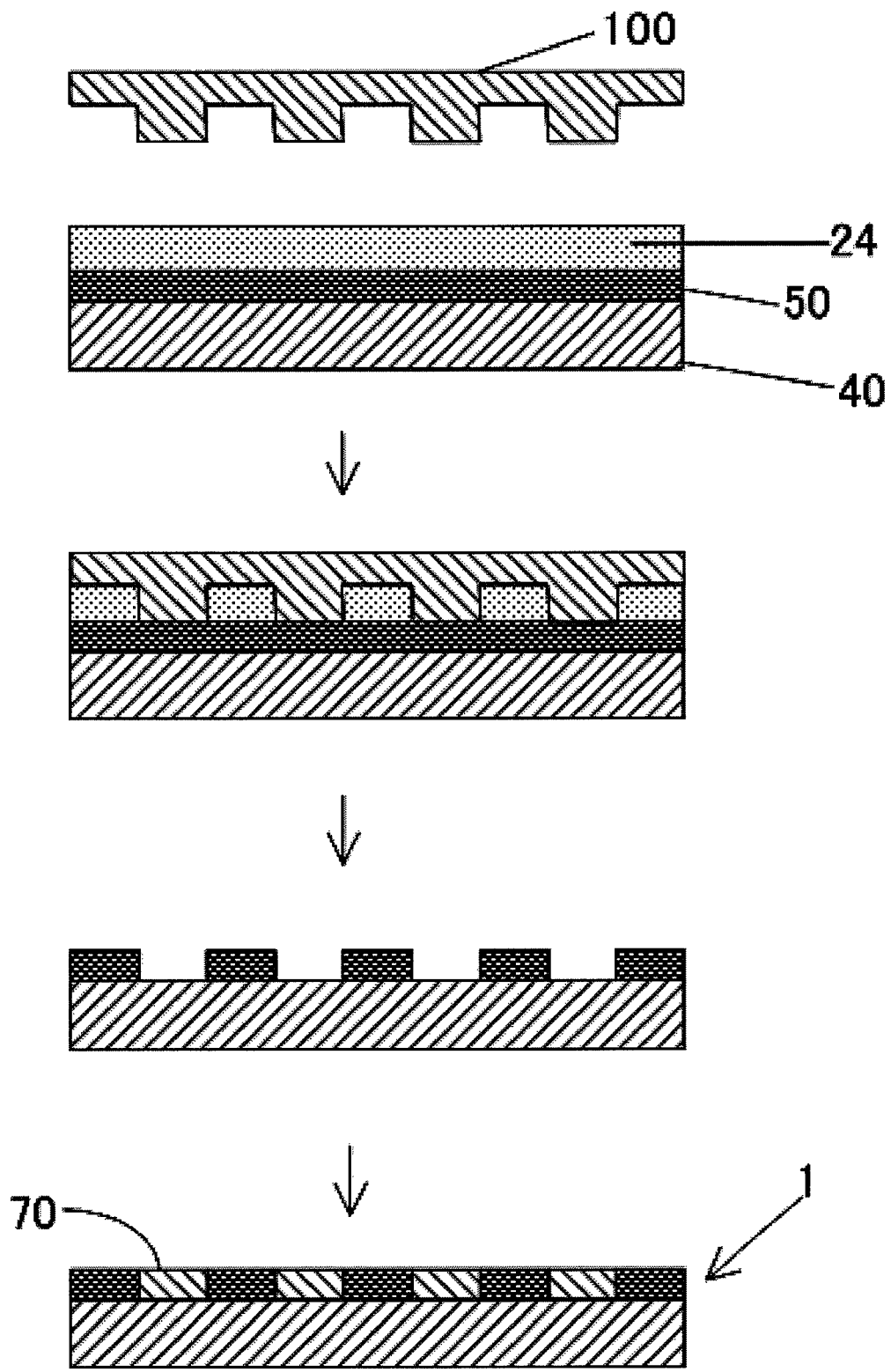
FIG. 9 is a cross-sectional view exemplarily showing a method for producing a magnetic recording medium using an imprint mold structure according to the present invention.

As shown in FIG. 9, a mold structure 100 is pressed at a pressure against a base 40 of the magnetic recording medium 1 on which a magnetic layer 50 and an imprint resist layer 24 are formed in this order by applying an imprint resist solution, thereby a convexo-concave pattern formed in the surface of the mold structure 100 can be transferred to the surface of the imprint resist layer 24.

Subsequently, using as a mask the imprint resist layer 24 to which convexo-concave patterns 110 and 120 formed in the surface of the mold structure 100 have been transferred, the substrate is selectively etched by RIE or the like to form in the magnetic layer 50 the convexo-concave pattern formed in the mold structure 100. Then a nonmagnetic material 70 is embedded in concave portions, the surface is smoothed, a protective film or the like is formed as required, whereby a magnetic recording medium 1 is obtained.

What is claimed is:

1. A method for testing a mold structure having a convexo-concave pattern formed on a surface thereof based on a desired design pattern, the method comprising:

transferring a magnetic signal corresponding to a convexo-concave pattern formed on the entire surface of the mold structure to a medium in a direction perpendicular to the surface of the medium, obtaining a reproduction signal by electrically reproducing the magnetic signal from the medium onto which the magnetic signal has been transferred, and comparing the desired design pattern with the reproduction signal.

2. The method for testing a mold structure according to claim 1, wherein the mold structure is formed in a disc-shape, the convexo-concave pattern formed on the entire surface of the mold structure comprises a first convexo-concave pattern formed in a direction perpendicular to the circumferential direction of the mold structure, and a second convexo-concave pattern of any one of convexo-concave pattern formed in the circumferential direction of the mold structure and a convexo-concave pattern where a plurality of bits are arranged.

3. The method for testing a mold structure according to claim 1, further comprising:
   providing a magnetic layer to the mold structure before the magnetic transfer.

4. The method for testing a mold structure according to claim 1,
   wherein in the obtainment of the reproduction signal, the magnetic signal that has been transferred to the medium is tested continuously.

5. The method for testing a mold structure according to claim 1,
   wherein in the obtainment of the reproduction signal, the magnetic signal that has been transferred to the medium is tested discretely.

* * * * *